United States Patent [19]

Winterhoff

[11] Patent Number: 4,714,280
[45] Date of Patent: Dec. 22, 1987

[54] HEAT-SHRINKABLE CONNECTION COMPRISING A VARIABLE CHANNEL AND A COOPERATING ELEMENT

[75] Inventor: Hans Winterhoff, Hagen, Fed. Rep. of Germany

[73] Assignee: RXS Schrumpftechnik-Garnituren GmbH, Fed. Rep. of Germany

[21] Appl. No.: 863,859

[22] Filed: May 16, 1986

[30] Foreign Application Priority Data

May 17, 1985 [DE] Fed. Rep. of Germany ....... 3517857

[51] Int. Cl.⁴ .............................................. F16L 47/00
[52] U.S. Cl. .................................... 285/381; 285/419; 285/909; 174/DIG. 8
[58] Field of Search .............. 285/381, 419, 921, 909; 138/99, 170, 178 U.S. only, 128; 174/DIG. 8

[56] References Cited

U.S. PATENT DOCUMENTS

| | | | |
|---|---|---|---|
| 2,739,089 | 3/1956 | Hageltorn | 285/921 X |
| 3,467,761 | 9/1969 | Plummer | 138/178 |
| 3,542,077 | 11/1970 | Muchmore | 285/381 X |
| 3,899,807 | 8/1975 | Sovish et al. | 138/178 X |
| 4,153,747 | 5/1979 | Young et al. | 138/99 X |
| 4,252,849 | 2/1981 | Nishimura et al. | 138/178 X |
| 4,280,258 | 7/1981 | Kunze | 174/DIG. 8 X |
| 4,364,419 | 12/1982 | Nolf | 174/DIG. 8 X |
| 4,379,473 | 4/1983 | Kunze | 174/DIG. 8 X |
| 4,384,906 | 5/1983 | Molinari | |
| 4,388,488 | 6/1983 | Wlcek et al. | 174/DIG. 8 X |
| 4,399,840 | 8/1983 | Lee | 138/99 X |
| 4,438,294 | 3/1984 | Meltsch et al. | 174/DIG. 8 X |
| 4,490,422 | 12/1984 | Pascher | |

FOREIGN PATENT DOCUMENTS

| | | |
|---|---|---|
| 78416 | 5/1983 | European Pat. Off. . |
| 3135766 | 4/1983 | Fed. Rep. of Germany ...... 285/381 |
| 1503328 | 3/1978 | United Kingdom . |
| 1594018 | 7/1981 | United Kingdom . |
| 2164114 | 3/1986 | United Kingdom . |

Primary Examiner—Thomas F. Callaghan
Attorney, Agent, or Firm—Hill, Van Santen, Steadman & Sipson

[57] ABSTRACT

The invention involves a heat-shrinkable connection comprising a longitudinal channel and a cooperating element thickened at its end. The channel is composed of lateral leg parts which are dimensionally stable under the application of heat, and of at least one shrink region adaptable to the cooperating element in positively locking fashion under the application of heat. The shrink region in the connecting region thereby facilitates the joining of the connecting elements along the formed parts to be connected or along the longitudinal edges of an envelope.

16 Claims, 10 Drawing Figures

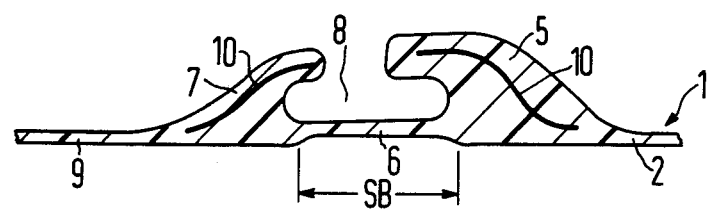
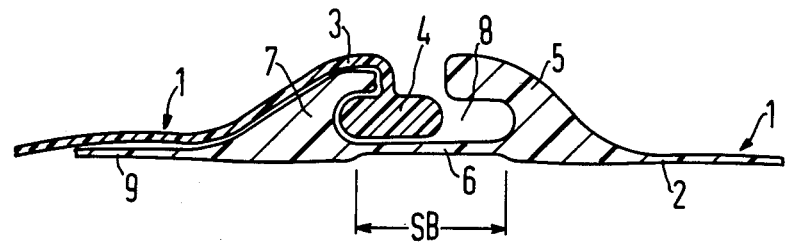
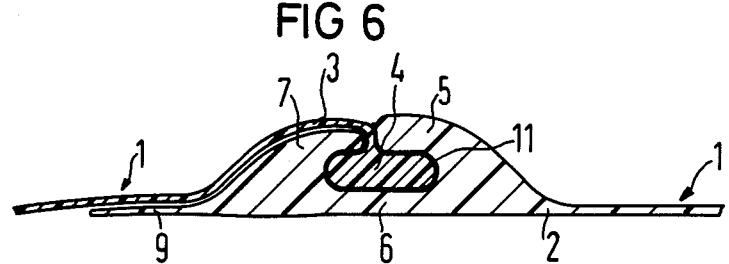
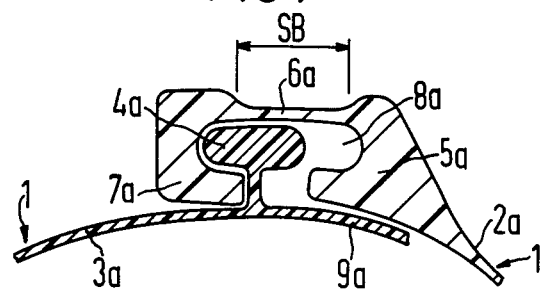

HEAT-SHRINKABLE CONNECTION COMPRISING A VARIABLE CHANNEL AND A COOPERATING ELEMENT

BACKGROUND OF THE INVENTION

1. Field of the Invention

The invention relates to a heat-shrinkable connection comprising a channel and a cooperating element thickened at its end.

2. Description of the Prior Art

In known closure devices for longitudinally divided sleeves of shrinkable material such as that, for example, of the European patent application No. 00 78 416, the closure elements along the longitudinal edges are composed of non-shrinkable material which is as non-deformable under heat as possible in order to avoid unallowed deformations in the closing region. This, however, leads thereto that the closure elements must already be hooked into one another firmly and pull-resistant during assembly or mounting. Greater forces and, under certain conditions, special tools are thereby needed for closing in order to bring the corresponding closure elements into their hooked position, this usually being attainable via corresponding lenticulations.

SUMMARY OF THE INVENTION

An object of the present invention is to find a connection for formed parts to one another or for longitudinally divided envelopes of shrinkable material whose elements can be brought together in a simple way and form an intimate and reliable union in the shrunken condition, whereby no additional mounting or assembly auxiliaries should be required. This object is achieved in accord with the invention with a heat-shrinkable connection of the type initially set forth above in that the channel is composed of leg parts which retain their shape upon the application of heat and of at least one shrink region which is adaptable in positively locking fashion to the cooperating element upon the application of heat.

Particular advantages derive with the connection arrangement of the invention for individual formed parts to be joined to one another or for a closure along the longitudinal edges of a heat-shrinkable envelope, deriving particularly in that the closure elements along the two connecting edges can be engaged into one another in a simple and yet already secured fashion without auxiliary means during assembly or mounting, i.e. when being joined. An interlock which no longer allows unintentional opening during the assembly or mounting phase is thereby already established. The connection arrangement of the invention is then fashioned such that its closure elements can ultimately be pressed together in a positively locking fashion in accord with their inherent shape memory by applying heat, i.e. during the actual shrinking process, namely in a simple way in that at least one part in the closing region is designed shrinkable, the squeezing of the individual closure elements against one another ultimately ensuing on the basis thereof. The closure elements are essentially composed of a channel into which a cooperating element is inserted. Upon the application of heat, the channel then has the capability of modifying one part such on the basis of its shape memory that the inserted cooperating element is firmly embraced. In an exemplary embodiment of the invention, this shape modification ensues by constricting the channel and, in a second exemplary embodiment, ensues by the formation of an undercut as a consequence of the back-formation of the shrink regions at the end of the two leg parts of the channel. Additional advantageous developments are also possible.

BRIEF DESCRIPTION OF THE DRAWINGS

The invention shall now be set forth in greater detail with reference to ten Figures.

FIG. 4 indicates the possibilities for reinforcing the connecting region.

FIG. 5. illustrates the pre-assembled connection before the shrinking process.

FIG. 6 illustrates the final condition of the shrunken connection.

FIG. 7 illustrates an inversion of the connection elements.

DESCRIPTION OF THE PREFERRED EMBODIMENTS

Figure 1:
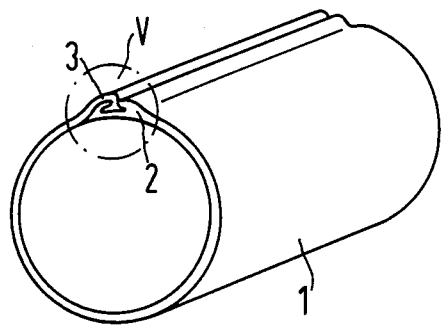
FIG. 1 shows a shrinkable envelope comprising the fundamental arrangement of the connection of the invention as an exemplary embodiment.

FIG. 1 shows a heat-shrinkable connection with reference to the example of a heat-shrinkable envelope 1 of the invention, whereby merely the fundamental arrangement of the connection region V along the two longitudinal edges 2 and 3 is visible herein. The envelope 1 is composed of heat-shrinkable material and the inside thereof is expediently coated with a hot-melt adhesive which serves the purpose of adhesion and sealing. The connecting region V shall now be set forth in detail, whereby it is of no consequence whether the connecting elements of the invention are applied along the longitudinal edges of an envelope or are respectively applied as corresponding elements at different formed parts to be connected to one another.

Figure 2:
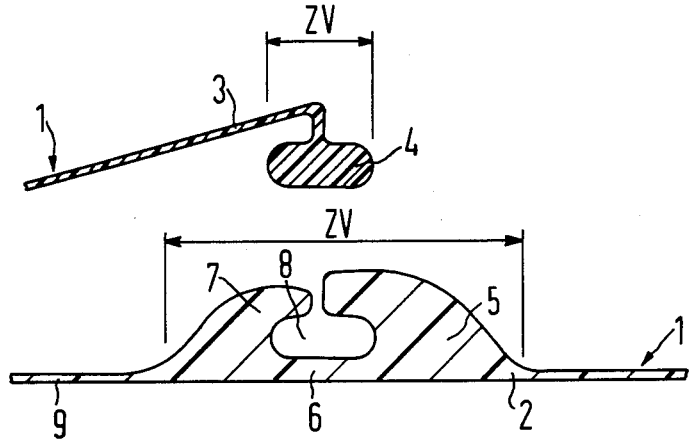
FIG. 2 illustrates details of the individual parts of the connection before being lent the shrinkable properties.

FIG. 2 then shows the connecting region V of the envelope 1 in detail. The longitudinal edge 3 is fashioned in the form of a two-sided swelling at its end as a cooperating element 4 for a channel 8. In order to be able to guarantee the shape stability upon the application of heat, a region ZV is subjected to an auxiliary crosslinking. The cooperating element 4 is inwardly directed toward the channel 8 along the second longitudinal edge 2. The channel 8 is formed by two longitudinally proceeding leg parts 5 and 7, whereby the inside surfaces of these leg parts 5 and 7 are inwardly directed, being at least obliquely directed toward one another so that the undercut channel 8 is formed. As a consequence thereof, however, an extremely narrow buttoning location derives for the cooperating element 4. Since the lateral leg parts 5 and 7 should likewise be as non-deformable as possible upon the application of heat, this region ZV is likewise at least more highly crosslinked than the shrinkable part of the envelope 1. With respect to the channel 8, however, this illustration shows the condition thereof before the widening or stretching, this condition being approximately reestablished following the shrinking process. In this illustration, however, the cooperating element 4 is not buttoned in.

Figure 3:
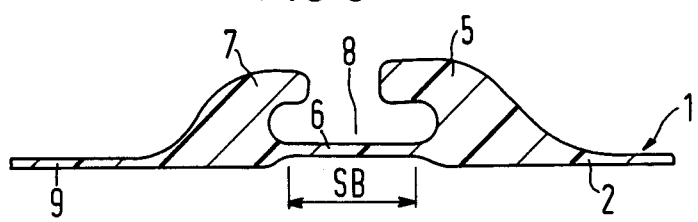
FIG. 3 shows the channel comprising a shrinkable channel root.

In accord with the stated object, the individual connecting elements in the invention should be engagable into one another in a simple way. This is shown in FIG. 3 wherein, however, only the longitudinal edge 2 of the envelope 1 is shown, since the cooperating element 4 is always retained in its original shape. In order to facilitate the ingress for the cooperating element 4, a shrink region SB adaptable to the cooperating element 4 in positively locking fashion is provided, this shrink region being fashioned here as a dilated or stretched and, thus, shrinkable channel root or floor 6. Due to the widening or, respectively, stretching of this channel root 6, the admission gap of the channel 8 for the cooperating element 4 is enlarged, so that the latter can be effortlessly pressed in. The widening is thereby expediently dimensioned such that a slight interlock is retained, so that unintentional opening of the connection is no longer possible during pre-assembly. After the cooperating element 4 has been introduced into the channel 8, the channel root 6 is in turn contracted by shrinkage under the application of heat, whereby the positively locking adaptation to the introduced cooperating element 4 derives.

FIG. 4 shows that the lateral leg parts 5 and 7 can be additionally supported with reinforcing inserts 10 in order to design them in a particularly resistant fashion. The remaining conditions are the same as those in the preceding example.

FIG. 5 illustrates the joining of the two connecting elements in their condition before shrinking. It thereby becomes clear that, for example, the leg part 7 is designed lower than the leg part 5, so that a closing format which is symmetrical toward the outside nonethless derives after the application of the longitudinal edge 3. The longitudinal edge 2 is, for example, lengthened to form an inside flap 9 by means of which the sealing surface is lengthened, whereby a continuous transition between the connecting region and the shrinkable part of the envelope 1 also derives. In this illustration, the connecting region is still in its unshrunken condition.

FIG. 6 then shows the connecting region in its shrunken condition, i.e. the back-formation and, thus, the constriction of the channel root 6 up to positively locking contact of the cooperating element 4 with the inside surfaces of the channel 8 have already ensued. A hot-melt adhesive, for example, has been introduced as a sealant and adhesive 11, this being activated upon application of heat and thus enhancing the sealing effect.

In FIG. 7, the connecting region is cambered in comparision to the preceding exemplary embodiment, this meaning that the channel 8a is arranged inwardly directed in the outside longitudinal edge 2a and the cooperating element 4a at the longitudinal edge 3a is arranged outwardly directed. In the preassembly, thus, the leg parts 5a–7a with the channel 8a lying therebetween are pressed onto the cooperating element 4a, whereby the now outwardly situated channel root 6a also comprises the shrink region SB herein. The widened admission gap which facilitates the mutual engagement thereby again derives. During heat-shrinkage, the shrink region SB again effects the positively locked and, thus, mutual adaptation of the connecting elements, as has already been set forth. Additionally advantageous here is that the shrink region SB of the channel root 6a lies at the outside and can thus be heated for shrinkage in a particularly favorable way. An inside flap 9a is also provided here for the improvement of the sealing conditions.

Figure 8:
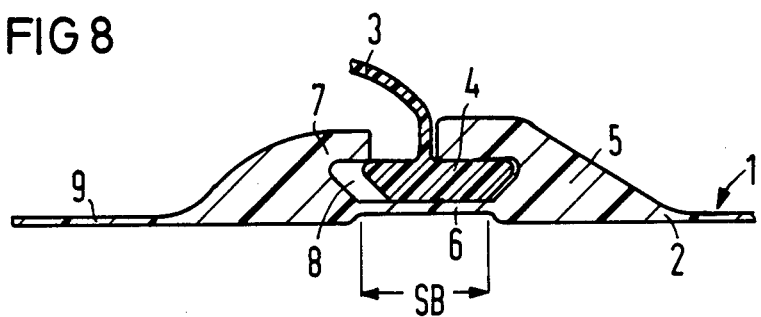
FIG. 8 shows a further shaping for a cooperating element.

FIG. 8 shows that the design of the cooperating element 4 can be variously fashioned in the sense of the invention, for example hammer-shaped with bevelled sidewalls by means of which the introduction into the channel 8 is additionally facilitated. The remaining conditions are identical to those already set forth.

Figure 9:
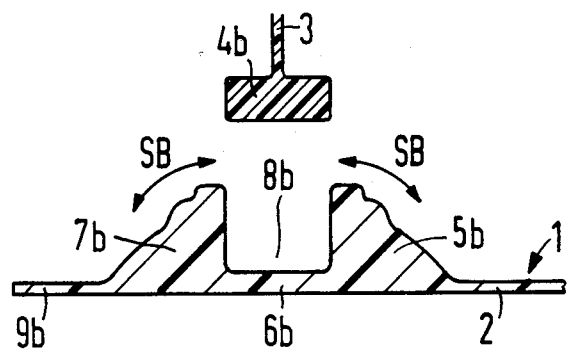
FIG. 9 illustrates a modification of the connection wherein the leg parts of the channel change in shape during the application of heat.

FIG. 9 shows an exemplary embodiment of the invention wherein the shrink region SB adaptable with positive lock is not fashioned as channel root as hitherto described but as adaptable ends of the two lateral leg parts 5b and 7b of the channel 8b. The channel 8b herein is fashioned roughly as a rectangular channel and thus allows the introduction of a cooperating element 4b which is fashioned particularly simply but still as a swelling of the longitudinal edge 3. A hammer-shaped format has been selected in this exemplary embodiment. Under the application of heat, the two shrink regions SB in the form of the ends of the lateral leg parts 5b and 7b pre-treated by the stretching process, i.e. provided with shape memory, are again approximately back-formed, namely into the original shape that already existed before stretching, this being provided as an undercut channel. This basic form is shaped such as already set forth with respect to the preceding exemplary embodiments. The back-formation of these shrink regions SB thus ensues under the application of heat after the introduction of the cooperating element 4b into the still open channel 8b.

Figure 10:
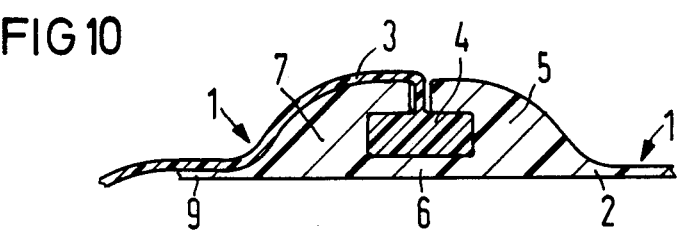
FIG. 10 shows the final condition of the connection with reference to the exemplary embodiment of FIG. 9, this, in its final condition, in turn comprising the form already initially set forth.

FIG. 10 then shows the condition of the connecting region comprising the connecting elements of FIG. 9 after the shrinkage process has been completed. The two ends of the leg parts 5b and 7b fashioned as shrink regions SB have returned in shape and embrace the introduced cooperating element 4 clamp-like and in latching fashion, as in the preceding exemplary embodiments of the invention, so that no external differences between the exemplary embodiments can be identified after shrinking.

It has thus been shown that the object initially stated can be achieved with the exemplary embodiment of the invention in an especially advantageous way, whereby it should again be pointed out that joining formed parts to one another can be undertaken by means of corresponding connecting elements provided at different formed parts. This possibility has not been separately emphasized in a Figure since the only difference from an envelope lies therein that the cooperating element (4, 4a, 4b) of the first formed part is introduced into the channel (8, 8a, 8b) of the second formed part, etc.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A heat-shrinkable connection having heat-deformable connecting elements composed of an axially elongated channel and of a cooperating element thickened at its end, comprising the improvement wherein said channel is composed of a pair of opposed, longitudinally elongated and continuous leg parts, which have dimensioned stability under the application of heat, and of at least one shrink region, being a floor of said channel formed integrally with said leg parts, said shrink region being laterally shrinkable to cause said opposed leg parts to move towards each other to engage said cooperating element in a positively locking fashion under the application of heat.

2. A heat-shrinkable connection according to claim 1, wherein said channel is formed of two leg parts having inside surfaces obliquely inclined relative to one another as undercut; and in that a channel root which shrinks under the application of heat and can constrict said channel is arranged as said shrink region between said two leg parts.

3. A heat-shrinkable connection according to claim 1, wherein said channel is composed of two leg parts having nearly parallel inside surfaces, said leg parts being dimensionally stable at a connected base portion of said legs and outer ends of said leg parts are inwardly shrinkable shrink regions which form undercuts upon the application of heat.

4. A heat-shrinkable connection according to claim 1, wherein said leg parts exhibit a higher degree of cross-linking than said shrink regions.

5. A heat-shrinkable connnection according to claim 1, wherein said connecting elements in the form of said channel and said cooperating element are arranged along the longitudinal edges of a hose-shaped, divided envelope.

6. A heat-shrinkable connection according to claim 5, wherein said channel is directed out and said appertaining cooperating element is directed in.

7. A heat-shrinkable connection according to claim 5, wherein said channel is directed in and said appertaining cooperating element is directed out.

8. A heat-shrinkable connection according to claim 1, wherein said cooperating element is fashioned button-like.

9. A heat-shrinkable connection according to claim 1, wherein said cooperating element is fashioned hammer-shaped.

10. A heat-shrinkable connection according to claim 9, wherein said cooperating element comprises slanting introduction sidewalls.

11. A heat-shrinkable connection according to claim 1, wherein said dimensionally stable leg parts include metal reinforcements.

12. A heat-shrinkable connection according to claim 1, wherein the inside surfaces of said channel are coated with a hot-melt glue sealant.

13. A heat-shrinkable connection according to claim 1, wherein said cooperating element is coated with a hot-melt glue sealant.

14. A heat-shrinkable connection according to claim 1, wherein said connecting elements in the form of said channel and said cooperating element are different formed parts which interengage to connect said different parts.

15. A heat-shrinkable connection for two parts comprising:
a first part having an axially elongated channel therein; and
a second part having a cooperating element sized to fit within said channel;
said channel having two opposed longitudinally elongated and continuous leg parts which are dimensionally stable under the application of heat and further having at least one shrink region being a floor of said channel formed integrally with said leg parts, said shrink region being laterally shrinkable to solely cause said opposed leg parts to move towards each other to positively lock said cooperating element in said channel upon the application of heat.

16. A heat-shrinkable connection for two parts comprising:
a first part having an axially elongated channel therein; and
a second part having a cooperating element sized to fit within said channel;
said channel having two opposed longitudinally elongated and continuous leg parts which have a base portion being dimensionally stable under the application of heat and further having a shrink region comprising the distal ends of said leg parts, said shrink region being shrinkable to cause opposed leg parts to move toward each other to positively lock said cooperating element in said channel upon the application of heat.

* * * * *